United States Patent [19]

Schmall

[11] Patent Number: 4,868,488
[45] Date of Patent: Sep. 19, 1989

[54] USE OF A DIELECTRIC MICROWAVE RESONATOR AND SENSOR CIRCUIT FOR DETERMINING THE POSITION OF A BODY

[76] Inventor: Karl-Heinz Schmall, Baden-Baden, Fed. Rep. of Germany

[21] Appl. No.: 272,324

[22] Filed: Nov. 17, 1988

[30] Foreign Application Priority Data

Nov. 27, 1987 [SE] Sweden .................................. 4625/87

[51] Int. Cl.[4] .......................... G01R 27/00; H01P 7/10
[52] U.S. Cl. ............................ 324/58.5 R; 324/58.5 C; 333/219.1
[58] Field of Search .............. 324/58.5 C, 58 C, 58 R, 324/58.5 R, 58.5 B, 236, 56; 340/551, 552, 561, 572; 333/202, 219.1

[56] References Cited

U.S. PATENT DOCUMENTS

| | | |
|---|---|---|
| 4,019,161 | 4/1977 | Katsuhiro Kimura et al. ... 333/82 B |
| 4,475,089 | 10/1984 | Kahnke ........................... 340/553 X |
| 4,477,785 | 10/1984 | Atia ............................... 333/219.1 X |
| 4,700,127 | 10/1987 | Sasaki et al. ..................... 324/58.5 C |
| 4,728,913 | 3/1988 | Ishikawa et al. ............ 333/219.1 X |
| 4,806,891 | 2/1989 | Kandpal ....................... 333/219.1 X |

FOREIGN PATENT DOCUMENTS

| | | |
|---|---|---|
| 0064000 | 3/1982 | European Pat. Off. . |
| 0190613 | 8/1986 | European Pat. Off. . |
| 2747539 | 4/1979 | Fed. Rep. of Germany . |
| 3325287 | 1/1985 | Fed. Rep. of Germany . |
| 981829 | 12/1982 | U.S.S.R. . |

OTHER PUBLICATIONS

Derwent Publication No. 83-782207/40, dated Nov. 16, 1983.

Primary Examiner—Reinhard J. Eisenzopf
Assistant Examiner—Jack B. Harvey
Attorney, Agent, or Firm—William R. Hinds

[57] ABSTRACT

The use of a microwave resonator is proposed as a sensor in an arrangement for determining the relative position of the sensor relative to a metal or non-metal body. The resonator may be a component of an oscillator and determine the natural frequency thereof. The resonator can also be connected as a filter. For suitable uses, it is possible to provide a plurality of resonators which can be designed and connected in accordance with the geometry of the object to be monitored.

10 Claims, 3 Drawing Sheets

USE OF A DIELECTRIC MICROWAVE RESONATOR AND SENSOR CIRCUIT FOR DETERMINING THE POSITION OF A BODY

FIELD OF THE INVENTION

The invention relates to uses of a dielectric microwave resonator for determining the relative position of a sensor with respect to a body.

DESCRIPTION OF THE PRIOR ART

Capacitive sensors or inductive sensors for detecting positions have long been known and conventional practice. In such sensors, the capacitance between the sensor and a workpiece or the sensor inductance which is influenced by the workpiece is arranged as a frequency-determining component of an oscillator circuit. Such sensors are described for example in GB-A-2085594, EP-A-0016638, DE-A-1928899, DE-A-2747539, U.S. Nos. 4015101 and 3171071 and a large number of other publications, some of which are to the present applicant. It is known that capacitive or inductive sensors of that kind are restricted to use in connection with electrically conductive or metal bodies. A variation in the relative position of the capacitive or inductive sensor with respect to the metal object results in a change in the inductance or capacitance, and thus a variation in frequency. That variation in frequency is detected in known evaluation circuits (for example band pass filters, discriminators, etc) and used to produce signals which correspond to the relative position of the sensor.

Generally, such sensors are required to be of small dimensions. Accordingly, there are only very low levels of sensor capacitance or sensor inductance available. However, the supply lines to the sensors also have capacitive and inductive properties. Thus, in particular line capacitances which may be substantially greater than the effective sensor capacitance itself are crucial. As a result, both the level of sensor sensitivity and also the general stability characteristics of such sensors may be adversely affected.

It has long been known for dielectric resonators to be used as filter components in high frequency circuits or as oscillators. The operating frequency of such resonators lies in the microwave or in the GHz range. Suitable circuit arrangements make use of the electromagnetic field of the dielectric resonators for selectively coupling two circuit portions so that either the result is a frequency-dependent attenuation characteristic in a filter circuit or a given frequency is formed discretely in an oscillator circuit by the particular electromagnetic properties of the resonator. In that respect dielectric resonators are represented in an equivalent circuit diagram as an LC-oscillator circuit.

For the purposes of fine tuning of such a circuit which is equipped with a dielectric resonator, use is made for example of a metal member (for example a screw) which can be moved towards the resonator in order to influence the electromagnetic field thereof.

A commercially available type of such resonators is described for example in Siemens Components 25 (1987), issue 2, page 86.

SUMMARY AND OUTLINE OF THE INVENTION

The object of the invention is to eliminate the disadvantages of known sensor circuits and in particular therefore to provide a sensor arrangement which is substantially independent of environmental influences and line capacitances or line inductances, while being of a small and simple construction. In accordance with the invention that is achieved by the use of a dielectric microwave resonator which is coupled by a terminated waveguide to at least one oscillator or the active component of an oscillator circuit, as a sensor, in an arrangement for determining the relative position of the sensor with respect to the body According to another aspect of the invention a sensor for determining the relative position of a sensor with respect to a body comprises at least one microwave resonator constituting the sensor, an arrangement for producing microwaves and an evaluation circuit.

It will be appreciated that, in the arrangement in accordance with the invention, LC-members are also provided in the oscillator circuits or oscillators used to produce the oscillations, in order to achieve the oscillation conditions. Surprisingly however it has been found that it is not the incorporation of the L- or C-members as sensor elements that results in optimum conditions, as has been assumed for decades and as was embodied in a practical situation. On the contrary, in the arrangement according to the invention the specified LC-circuits are provided in the form of a component which cannot be influenced by a variation in the relative position of the object. Instead, it is proposed that a microwave resonator should be additionally used as a frequency-determining component and as a sensor. That permits coupling to be effected by way of terminated lines, the length of which is practically non-critical. With suitable coupling-in/coupling-out (multiple of Lambda or Lambda/2), line losses and in particular the influence on frequency due to line capacitances or inductances are minimized.

The resonator is also not affected to the same extent as is the case with capacitive or inductive sensors, by other interference influences and in particular the approach of metal members (for example in the case of robots). On the one hand, by means of suitable casings, the resonator can be better screened from influences which lie outside the object detection region. Variations in capacitance due for example to the lateral approach in respect of a machine component or a part of a robot do not then influence the resonator frequency. On the other hand the variation in resonator frequency in dependence on the approach of an object remains constant even when disturbing influences occur. The two variations in frequency (due to the approach of an object and due to the approach of a disturbance object) are only added together. In contrast, in the case of capacitive sensors, the usable variation in frequency, due to a variation in sensor capacitance, decreases in proportion to an increasing influence in respect of interference capacitances. That means that the level of sensitivity of known sensors decreases with increasing interference influences while in the case of the invention, all that is to be expected is a shift in the frequency range of the resonator.

In that connection, it is found that a surprising, major technical advance is that the use of a resonator means that it is possible to determine the sensor position not only in relation to metal bodies but also in relation to non-conducting objects. It is known that the natural frequency of a resonator is increased by the approach of metal bodies, but is reduced by virtue of dielectric bodies. The invention therefore opens up completely new areas of use for contact-less sensors, in an unforeseeable fashion.

The coupling between the resonator and the waveguide may be effected for example directly by coupling loops or a microstrip transmission line. It is also possible to envisage other forms of coupling, for example the use of an additional resonator as the coupling element. The waveguide used may be any kind of terminated line, having regard to the high frequency range. Coaxial or strip transmission lines for example have proved themselves to be suitable.

The sensor used may be both an individual resonator (for example for measuring a distance) and also advantageously a plurality of resonators.

In that connection the resonator may advantageously be arranged as the frequency-determining component of the oscillator circuit itself. Both diode oscillators and also transistor oscillators can be used in that situation.

Particularly in complex areas of use, as for example when using a plurality of resonators, it may be advantageous for the resonator or resonators to be connected as a filter to the output of at least one oscillator circuit. Variations in relative position affect the filter characteristics of the resonators which are advantageously tuned to different frequencies so that corresponding selective frequency evaluation indicates the relative position of individual resonators.

It will be seen that in particular the resonance frequency of the resonator is influenced by the variation in the relative position of the sensor. In addition, the coupling between the waveguide and the resonator or between various resonators and quality as well as line impedance are influenced at the location of the resonator. Depending on the respective circuit design therefore the approach of an object may not only result in a change in frequency but also a change in amplitude or a change in phase, which can be evaluated by suitably frequency-selective, amplitude-selective or phase-selective evaluation circuits.

In particular the use of the resonator or two or more resonators as a filter/bank pass filter with an attenuation curve which is dependent on the relative position with respect to the object makes it possible to design high-sensitivity circuits with output signals which are variable in respect of magnitude and phase. The important consideration in relation to all embodiments is that the waveguides used as the feed line to the resonator are terminated, that is to say the terminal resistance corresponds to the characteristic wave impedance of the line.

In particular, for the purposes of producing complex signals which are selective in respect of distance/position, it may be advantageous for the oscillator arrangement to produce a plurality of frequencies. Of those, certain frequencies may be preferred or attenuated, in accordance with the respective variation in relative position a between resonators and object, so that in accordance with the invention it is possible both to use a given frequency, by way of the attenuation thereof, as a control variable for an absolute distance signal, and also to couple other frequencies as additional signals which are selective in respect of distance/position, to the dielectric resonator or resonators, by way of the waveguide.

In general, the invention makes it possible to produce substantially improved sensor circuits and also permits the detection of relative positions in relation to metal and also dielectric objects, in a contact-less mode, which hitherto was deemed to be impossible.

DESCRIPTION OF THE DRAWINGS

In order that the invention may be clearly understood and readily carried into effect, embodiments in accordance therewith will now be described, by way of example, with reference to the accompanying drawings in which.

DESCRIPTION OF PREFERRED EMBODIMENTS OF THE INVENTION

Figure 1:
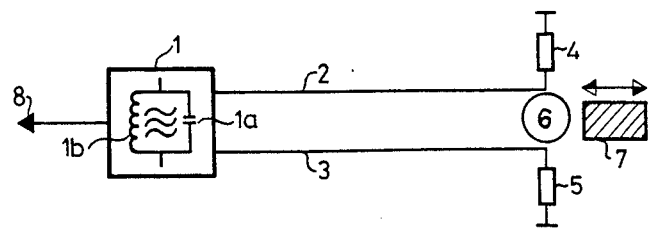
FIG. 1 is a diagrammatic view of a proximity sensor having features of the invention.

Referring to FIG. 1, an oscillator circuit is connected by means of waveguides 2 and 3 to a dielectric microwave resonator 6. The resonator 6 is a conventional ceramic component consisting of zirconium-tin titanate. It will be appreciated that other types of resonator may also be used. The waveguides 2 and 3 are provided at their ends with terminating resistors 4 and 5. The terminating resistors 4 and 5 are dimensioned in accordance with the characteristic wave impedance of the line so that in the ideal case the waveguides 2 and 3 behave in a reflection-free fashion. The resonator 6 is incorporated into the oscillator circuit in such a way that the resonator frequency determines the natural frequency of the oscillator 1. In that case the waveguides 2 and 3 are coupled by the resonator 6. The latter turns the phase of the input signal from the waveguide 2 in such a way that a voltage which is phase-shifted through 180° appears at the waveguide 3. That fulfills the resonance condition in respect of phase.

A diagrammatically indicated metal body 7 is arranged to be variable in its position relative to the sensor 6. The electromagnetic field of the resonator is varied by a variation in spacing. That alters the resonance frequency of the resonator 6 which correspondingly entrains the natural frequency of the oscillator 1. In that way the frequency of the oscillator 1 at the output 8 alters. That alteration in frequency can be converted by conventional evaluation circuits (not shown) into signals which can be subjected to further processing and which correspond to the frequency of the oscillator 1 and the resonator 6 and thus the spacing between the resonator 6 and the body 7.

In the illustrated embodiment the waveguides 2 and 3 are in the form of strip lines. It will be appreciated that any other form of a terminated line may be used, insofar as coupling with respect to the resonator 6 is then still possible.

FIG. 1 particularly clearly shows the essential distinction in relation to known sensor circuits: in this embodiment of the invention, it is not the diagrammatically illustrated capacitance 1a or the inductance 1b of the oscillator 1 that is entirely or partially used as the sensing means, but the additionally provided resonator 6.

Figure 2:
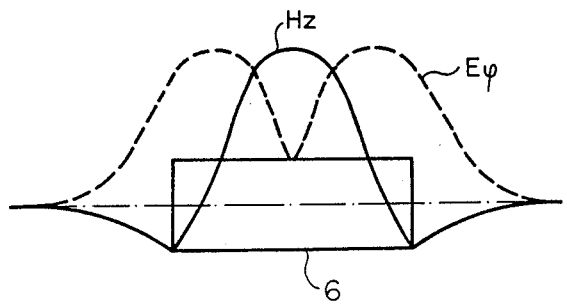
FIG. 2 shows the field distribution on a dielectric resonator.

FIG. 2 is a diagrammatic side view of the resonator 6, with the amplitudes of the magnetic field Hz and the electrical field Eφ.

Figure 3:
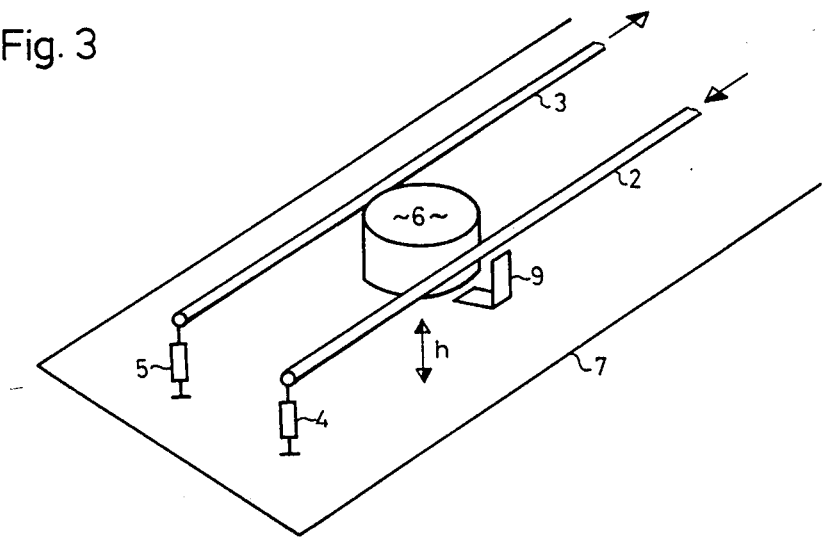
FIG. 3 illustrates the principle of resonator coupling.

FIG. 3 shows a diagram illustrating the principle of the arrangement, in which the resonator 6 is also used for coupling the two lines 2 and 3. The line 2 is connected in that arrangement to an oscillator (not shown) while the line 3 is connected to an amplifier (also not shown) and a suitable evaluation circuit. The lines 2 and 3 are terminated by the terminating resistors 4 and 5. The resonator 6 is also provided with a fine tuning device 9 in the form of a sheet metal strip. The sheet metal strip may be varied in regard to its spacing relative to the resonator 6, by means (not shown) such as a tuning screw whereby the resonator frequency can be compensated or adjusted. Illustrated beneath the resonator 6 is a dielectric body 7, for example a plastic plate. When the resonator 6 approaches the plastic plate 7, the frequency of the resonator 6 falls while when the spacing increases, the frequency of the resonator 6 rises. The coupling or filter characteristics, which are determined by the natural frequency of the resonator, as between the line 2 and the line 3 are also correspondingly altered.

Figure 4:
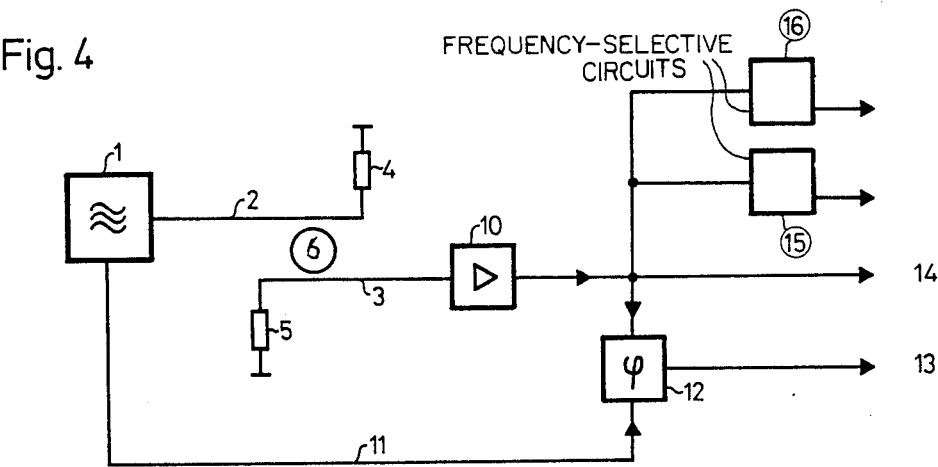
FIG. 4 is a diagrammatic view of a sensor arrangement in which the sensor is connected as a filter.

FIG. 4 shows a circuit arrangement having a resonator 6 for coupling of or as a filter element between the line 2 and the line 3. The line 2 is connected to the output of an oscillator circuit 1. The line 3 is connected by way of an amplifier 10 to an evaluation circuit which is described in greater detail hereinafter. As in the preceding embodiments, the lines 2 and 3 are terminated in a reflection-free manner by terminating resistors 4 and 5. The oscillator is designed in a conventional fashion in such a way that, depending on the situation of use, it can output one or more frequencies to the line 2. The signal which is transferred on to the line 3 by the resonator 6 is raised to evaluatable amplitudes in the amplifier 10. In addition, a reference signal is passed to a phase evaluation means 12 from the oscillator 1, by way of line 11. The phase evaluator 12 is connected with its second compression input to the output of the amplifier 0. Therefore, an output signal appears at the output 13, which characterizes the condition of the resonator and which represents the phase shift between the signal originally produce in the oscillator 1 and the signal which is coupled by way of the resonator 6. On the other hand, at the amplitude output 14 there is a signal which corresponds to the amplitude of the signal transmitted from the resonator 6. The highest amplitude will occur in that case if the frequency of the resonator 6 is entirely coincident with the frequency of the oscillator 1. The greater degree to which the resonator 6 is mistuned and the more the two phases differ from each other, the worse is the coupling characteristic of the resonator 6 as between the line 2 and the line 3 and the smaller is the signal at the output 14. In addition, two frequency-selective circuits 15 and 16 are connected to the output of the amplifier 10. The circuits 15 and 16 may be for example in the form of band pass filters or discriminators. The two circuits 15 and 16 can be tuned to predeterminable frequencies in known manner in such a way that they each output a respective output signal when the resonator 6 reaches the predetermined frequency. In that way it is possible to indicate predeterminable limit or threshold values which correspond to a given condition of the electromagnetic field of the resonator, as a result of external influences caused by an object.

Figure 5:
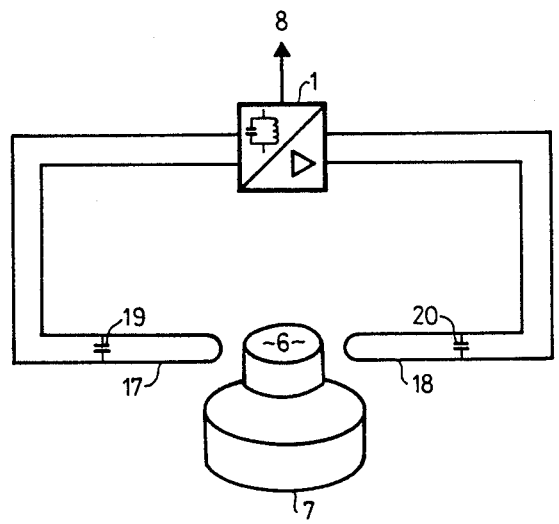
FIG. 5 is a modified embodiment with a resonator as a frequency-determining element in an oscillator circuit.

FIG. 5 shows an embodiment in which the resonator 6 is provided as part of an oscillator circuit. In that arrangement the resonator 6 is exicted by a conductor loop 17 and transmits a corresponding signal to a second conductor loop 18 to which it is also coupled. The two conductor loops 17 and 18 are connected to capacitors 19 and 20 as resonance members in order to eliminate troublesome subordinate resonances. An amplifier is integrated in known manner into the oscillator 1 to which the conductor loops 17 and 18 are connected, in such a way that the natural oscillation conditions in respect of magnitude and phase are achieved in known manner. At the output 8 of the oscillator 1 is the output frequency which is determined by the resonator 6 or the relative position thereof with respect to the body 7.

Figure 6:
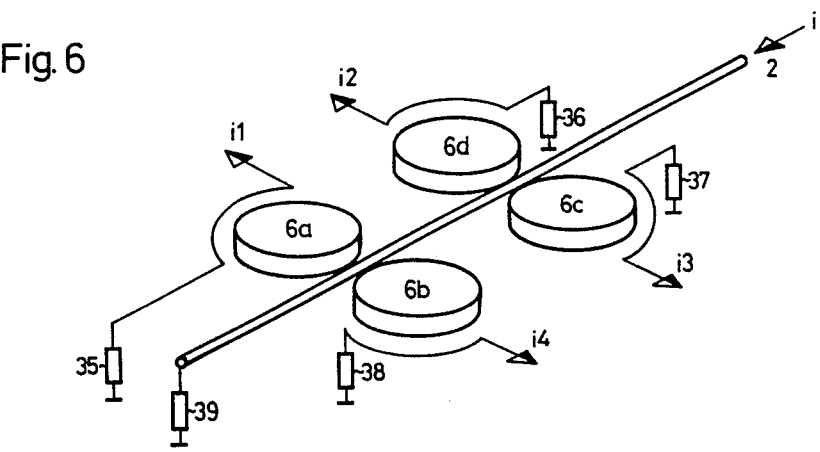
FIG. 6 shows an embodiment of the invention with four resonators connected as filters.

FIG. 6 is a multiple arrangement of resonators 6a, 6b, 6c and 6d. In that case, the configuration of the magnetic field lines H (see FIG. 2) is used, by way of the resonators 6a through 6d, to produce position-sensitive signals in addition to spacing signals. As an example of a possible multiple resonator arrangement, FIG. 6 shows a filter circuit which has a common excitation line 2. The coupled voltages from the four resonators are available separately at the respective outputs $i_1$, $i_2$, $i_3$ and $i_4$ and those voltages can be suitably evaluated for example by an evaluation circuit as shown in FIG. 4. The arrangement can be of an inexpensive design by virtue of a multiplex mode of operation of the amplifiers. With such a multiple arrangement of resonators, the use of the characteristic configuration of the H-characteristic of the field distributions can produce points of concentration which are dependent on direction and which extend parallel to the surfaces of the resonators. In that way it is possible with such arrangement for example to provide for a centering effect by way of a metal tip member or a pin as an identical condition in respect of the resonators—and thus an identical phase—only occurs when all resonators 6a through 6d are influenced by the object in the same fashion, that is to say when the object is disposed centrally between the resonators 6a through 6d. To provide a pratical construction, it is only necessary for a suitable follow-up adjustment circuit to be connected to the evaluation circuit in known fashion.

The arrangement of the resonators and the number of resonators depends on the respective function to be performed or the object, the position of which is to be detected by sensors. In the case of circuits having a plurality of resonators, it is possible to use a plurality of oscillator circuits, according to the number of resonators; the oscillator circuits are operated either at a common frequency or preferably at different frequencies and they each have a frequency-evaluating and/or phase-evaluating and/or amplitude-evaluating evaluation circuit. In that case an evaluation circuit may be connected to operate in a multiplex mode of operation, that is to say it can be cyclically connected to a plurality of resonator circuits in order to reduce the level of expenditure on electronic circuit means.

Figure 7:
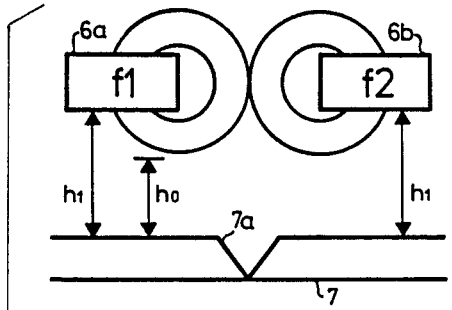
FIGS. 7 and 8 are diagrammatic views of two sensor resonators for gap tracking purposes over an object with respective frequency/attenuation characteristics.
Figure 7:
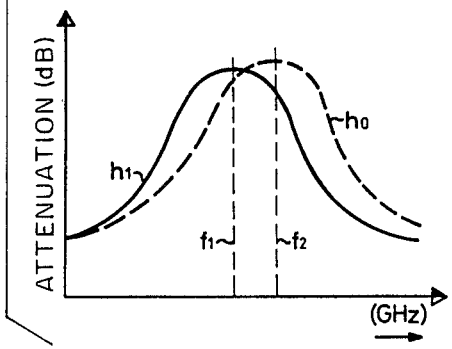

FIG. 7 shows an arrangement having two resonators 6a and 6b over body 7 which in the specific case in question is a steel plate with a V-shaped seam or joint 7a.

Figure 8:
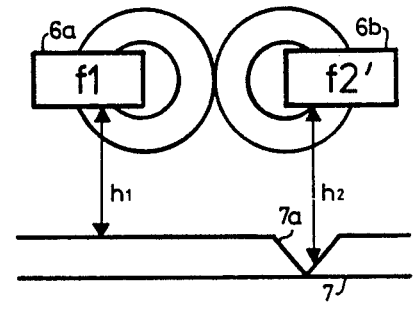
Figure 8:
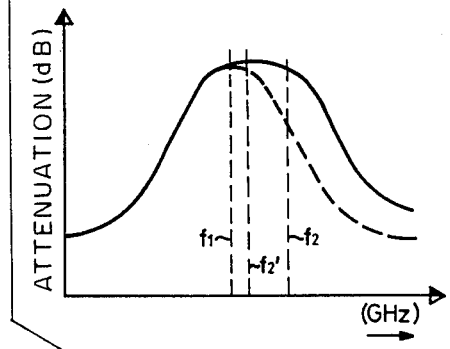

In the embodiment shown in FIGS. 7 and 8, only the resonator 6a is connected to an oscillator (not shown) by strip lines (also not shown). The resonator 6b is inductively coupled to the resonator 6a. The resonators 6a and 6b are tuned to different frequencies f1 and f2.

The graph in FIG. 7 diagrammatically shows the configuration of the transmission attenuation effect of the resonators 6a and 6b at the spacing $h_1$ relative to the metal body 7. An approach movement to give a spacing $h_0$ causes a shift of the transmission curve as both frequencies f1 and f2 of the resonators 6a and 6b are raised.

FIG. 8 diagrammatically shows the curve configuration in the event of a lateral displacement of the resonators 6a and 6b over the V-shaped seam 7a. It will be seen in that case that the conditions in respect of the resonator 6a remain constant, and that is expressed by virtue of the frequency f1 remaining the same. In contrast the frequency of the resonator 6b alters as it is a greater spacing relative to the metal body 7, in the region of the seam 7a. That results in the frequency f2', whereby the curve assumes the configuration shown in broken lines.

The change in the transmission characteristic of the resonators as shown in FIGS. 7 and 8 may be evaluated for example by a circuit which is of a similar design to the embodiment shown in FIG. 4. For example, the variation in the frequency characteristic may be monitored by means of a plurality of frequency-selective circuits 15 and 16 (see FIG. 4). Corresponding conversion into position signals or spacing signals may be achieved by known circuit arrangements.

I claim:

1. A method of determining the position of a sensor with respect to a body comprising using a dielectric microwave resonator as the sensor, locating said sensor in a position for its resonant frequency to be influenced by the presence of the body, coupling said sensor to oscillator means by at least one terminated waveguide and determining the oscillation of a circuit comprising said sensor, said waveguide and said oscillator means as an estimation of the location of said sensor in relation to the body.

2. A method according to claim 1, in which said resonator is used as a frequency-determining element in said circuit.

3. A method according to claim 1, in which said resonator is connected as a filter in said circuit.

4. A method according to claim 3, in which said oscillator means are arranged to output at least two different frequencies to said resonator.

5. A sensor circuit for determining the relative position of a sensor with respect to a body comprising at least one dielectric microwave resonator to be used as a sensor and constructed for its resonant frequency to be influenced by the presence of the body when located in the vicinity of the body, means for producing microwaves coupled to said resonator, and an evaluation circuit responsive to the oscillation of said sensor when subject to said microwaves.

6. A sensor circuit according to claim 5, in which said means for producing microwaves coupled to said resonator comprise an active component of at least one oscillator circuit and terminated waveguides coupled to said resonator.

7. A sensor circuit according to claim 6, in which said resonator on the one hand is coupled as a filter to said oscillator active component by one said terminated waveguide and on the other hand to said evaluation circuit, said evaluation circuit being formed as an oscillation-selective circuit.

8. A sensor circuit for determining the relative position of at least two sensors with respect to a body comprising at least two dielectric microwave resonators to be used as sensors and each constructed for its resonant frequency to be influenced by the presence of the body when located in the vicinity of the body, means for producing microwaves coupled to said resonator, and evaluation circuits respectively responsive to the oscillations of said sensors when subject to said microwaves.

9. A sensor circuit according to claim 8, in which said resonators are coupled together.

10. A sensor circuit according to claim 8, in which said resonators have different resonant frequencies.

* * * * *

UNITED STATES PATENT AND TRADEMARK OFFICE
CERTIFICATE OF CORRECTION

PATENT NO. : 4,868,488
DATED : September 19, 1989
INVENTOR(S) : KARL-HEINZ SCHMALL It is certified that error appears in the above—identified patent and that said Letters Patent is hereby corrected as shown below:

On the first page of the printed patent, the information page, under the heading Foreign Application Priority Data, "[SE] Sweden" is changed to --[CH] Switzerland--.

Signed and Sealed this

Sixth Day of November, 1990

Attest:

HARRY F. MANBECK, JR.

*Attesting Officer*   *Commissioner of Patents and Trademarks*